US006240365B1

(12) United States Patent
Bunn

(10) Patent No.: US 6,240,365 B1
(45) Date of Patent: *May 29, 2001

(54) AUTOMATED VEHICLE TRACKING AND SERVICE PROVISION SYSTEM

(76) Inventor: Frank E. Bunn, 107 Fordwich Crescent, Etobicoke, Ontario M9W 2T6 (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,184

(22) Filed: Sep. 30, 1998

Related U.S. Application Data

(63) Continuation of application No. 08/786,184, filed on Jan. 21, 1997, now abandoned.

(30) Foreign Application Priority Data

Jan. 21, 1998 (CA) .................................................. 2227664

(51) Int. Cl.$^7$ ............................. G06F 15/21; G06F 17/60

(52) U.S. Cl. .......................... 701/213; 701/202; 701/209; 340/988

(58) Field of Search ..................................... 701/213, 202, 701/209; 340/988–995, 825.31

(56) References Cited

U.S. PATENT DOCUMENTS

| | | | |
|---|---|---|---|
| 4,728,922 | 3/1988 | Christen et al. | 340/52 R |
| 5,066,853 | 11/1991 | Brisson | 235/381 |
| 5,231,584 * | 7/1993 | Nimura et al. | 701/202 |
| 5,289,369 * | 2/1994 | Hirshberg | 340/992 |
| 5,635,693 | 6/1997 | Benson et al. | 235/384 |
| 5,636,122 | 6/1997 | Shah et al. | 364/449.1 |
| 5,669,061 | 9/1997 | Schipper | 455/429 |
| 5,673,305 | 9/1997 | Ross | 379/58 |
| 5,686,892 | 11/1997 | Smith | 340/572 |

* cited by examiner

*Primary Examiner*—William A. Cuchlinski, Jr.
*Assistant Examiner*—Yonel Beaulieu
(74) *Attorney, Agent, or Firm*—Pillay, Kevin Fasken Martineau DuMoulin LLP

(57) ABSTRACT

An automated vehicle tracking and service provision system including a central controller, a local controller located in each vehicle, the central controller and the local controllers including wireless communication interface for communication of information between the central controller and the vehicle based on fuzzy logic algorithms decision making software. In a preferred embodiment, the local controller includes a processor, a global positioning systems (GPS) sensor coupled to the processor for providing vehicle location in terms of latitude and longitude, a memory coupled to the processor, a plurality of sensors coupled to the processor and adapted to provide information on a plurality of parameters related to the vehicle such as fuel level, collision status, brakes and such like, a user interface coupled to the processor for providing user input from input devices such as a credit card reader, smart card reader or keyboard, a wireless transceiver is coupled to the processor for communicating data from the processor to the central controller and for receiving data from the central controller, and a display.

Provides for a voice or audio input/output interface coupled to the user interface for providing voice activation of the processor or voice transmission via the wireless transceiver to the central controller.

22 Claims, 15 Drawing Sheets

AUTOMATED VEHICLE TRACKING AND SERVICE PROVISION SYSTEM

This application is a continuation of Ser. No. 08/786,184 filed Jan. 21, 1997 abn.

The present invention relates generally to an automated service provision system and in particular to an automated motor vehicle rental service.

BACKGOUND OF THE INVENTION

Automobile rental, particularly, in North America is a thriving industry. A car rental system is based on a fleet of vehicles, which may be picked up and used by a customer who rents and then picks up a vehicle, and after use, returns the vehicle to a specified location. A large number of these rental locations are located at airports, railway stations or some other public transport terminals. In most cases, it is generally necessary to reserve a vehicle beforehand. The actual process of acquiring a vehicle by the customer is fraught with administrative formalities that are both time consuming and frustrating for the customer.

Furthermore, for the business traveler or customer, last minute travel arrangements are not uncommon. In these instances, reservations or rentals of vehicle are normally made at the time of arrival at a airport. It would be advisable in these circumstances at least to reduce or minimize the administrative formalities required in reserving and obtaining a vehicle.

Also, in a large number of instances, the customer is in a foreign location and requires directions to a particular destination beforehand. This information is normally obtained from a rental agent at the rental site further adding time delays both to the customer and other customers waiting for a similar service. Thus in a high traffic environment it is generally required for a large number of personnel to be stationed at a rental kiosk. This is both costly and inefficient use of personnel, particularly in off peak periods.

A further aggravating formality is the inspection of the vehicle by the customer for damages and suchlike prior to signing the rental agreement. Furthermore it is also required on return of the vehicle that a similar inspection is performed. Once again this is both onerous, time consuming and frustrating for the customer. For the rental company, some types of damages are not readily apparent at the time that the vehicle is returned by the customer. For example, stone chips on windshields that subsequently result in the cracking of the windshield may inadvertently be ascribed to subsequent customers renting that vehicle.

Although not directly related to vehicle rental, most travelers make use at one time or another of a cellular or mobile wireless telephone. In the case of a person travelling outside their local mobile service provision territory, additional roaming features are required to be purchased in order to have access to telephone numbers outside the subscribers network. It would be thus desirable to avoid, if possible, such costs.

Thus is may be seen from the above discussion that there is a need for a system and method that mitigates at least some of the above disadvantages.

SUMMARY OF THE INVENTION

This invention seeks to provide a vehicle tracking and automated rental of the vehicle and associated services.

In accordance with this invention there is provided an automated vehicle tracking and service provision system comprising a central controller, a local controller located in each vehicle, the central controller and the local controllers including wireless communication means for communication of information between the central controller and the vehicle and fuzzy logic decision making software.

According to a preferred embodiment, the local controller includes a processor, a global positioning systems (GPS) sensor coupled to the processor for providing vehicle location in terms of latitude and longitude, a memory coupled to the processor, a plurality of sensors coupled to the processor and adapted to provide information on a plurality of parameters related to the vehicle such as fuel level, collision status, brakes and such like, a user interface coupled to the processor for providing user input from input devices such as a credit card reader, smart card reader or keyboard, a wireless transceiver is coupled to the processor for communicating data from the processor to the central controller and for receiving data from the central controller, and a display.

There is further provided a voice or audio input/output means coupled to the user interface for providing voice activation of the processor or voice transmission via the wireless transceiver means to the central controller.

In a further embodiment, the local controller implements in conjunction with the central controller, a mobile point of sale service.

A further embodiment provides for a voice encoded transmission of data.

BRIEF DESCRIPTION OF THE DRAWINGS

These and other advantages of the present invention become more apparent from the following discussion of preferred embodiments of the invention which are described by way of example only and with reference to the accompanying drawings in which like elements have been assigned like reference numerals and wherein.

DETAILED DESCRIPTION OF PREFERRED EMBODIMENTS

Figure 1:
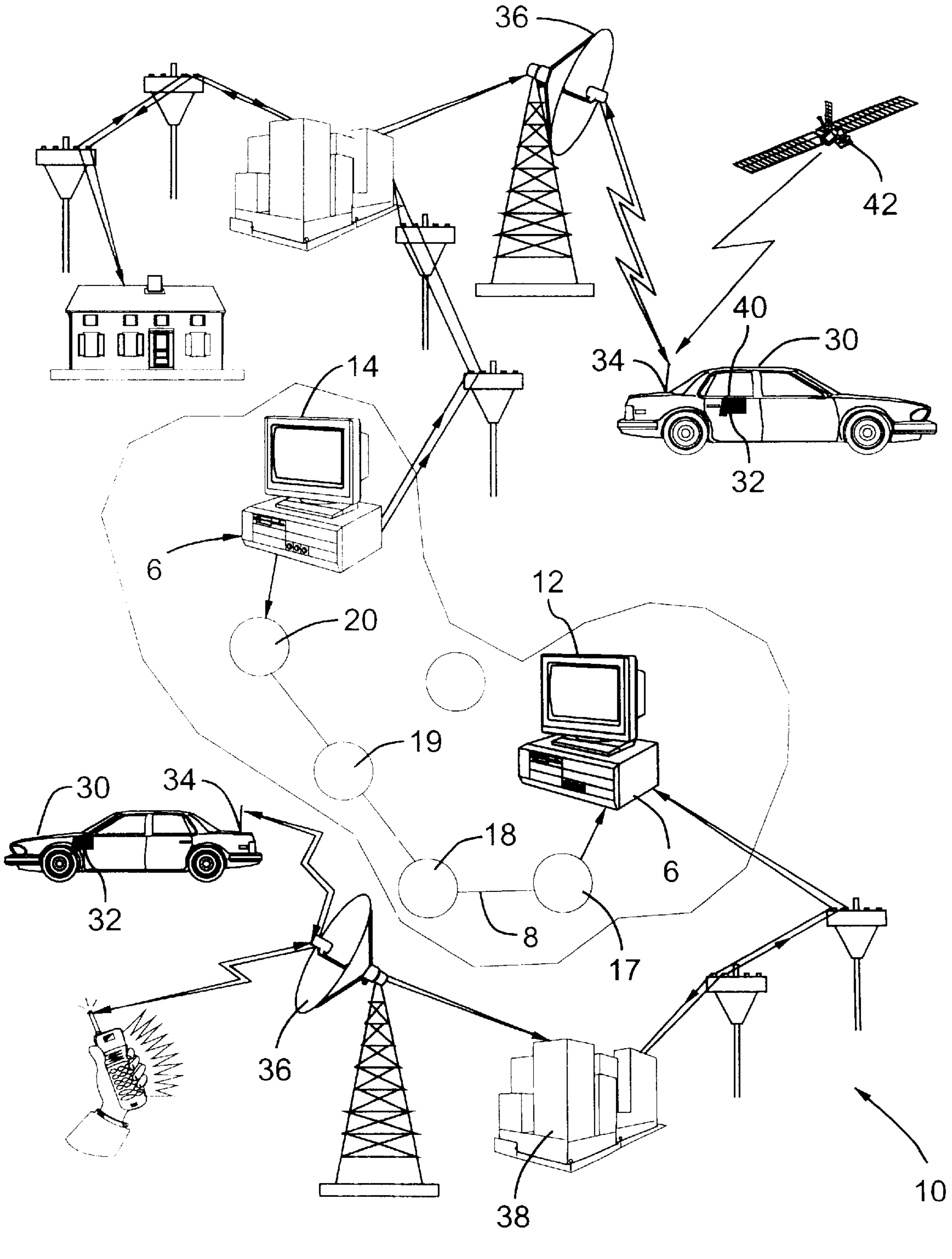
FIG. 1 is a schematic diagram of a system according to an embodiment of the present invention.

Referring to FIG. 1, a schematic view of a vehicle tracking and communications network according to an embodiment of the present invention is shown generally by numeral 10. The system includes a central controller or computer 6 normally located at a headquarters (HQ) serving a specified geographic area. These geographic areas may range from a single town to entire countries or continents. The network includes one or more central controllers. The central controllers are connected via a network such as a telephony network or the Internet. The central controllers which serve a specified geographic area may be located for example at rental vehicle agencies and may also be accessed by independent distributed terminals linked by suitable communication networks.

One of the central controllers 6 may be designated an originating HQ 12 and another HQ may be termed a destination controller 14. The network of originating destination HQ systems 12 and 14 provide voice or data communication over the network, for example, the Internet, to other linked computers indicated by numerals 17, 18, 19 and 20 respectively.

Rental vehicles 30 each include a local controller 32 provided with a cellular or mobile telephone equipment 34. The cellular phones communicate with appropriate cellular telephone network systems 36. The cellular telephone network connects into a phone company 38 which in turn connects a number called to a predetermined HQ 6. This predetermined HQ is designated the originating HQ 12 mentioned earlier. These connections are normally performed by normal land based telephone lines.

Each local controller located in the vehicle 30 also includes a global position sensor (GPS) 40 for receiving geo position data from satellites 42. The acquisition of this position data is well known in the art and will not be discussed further.

Figure 2A:
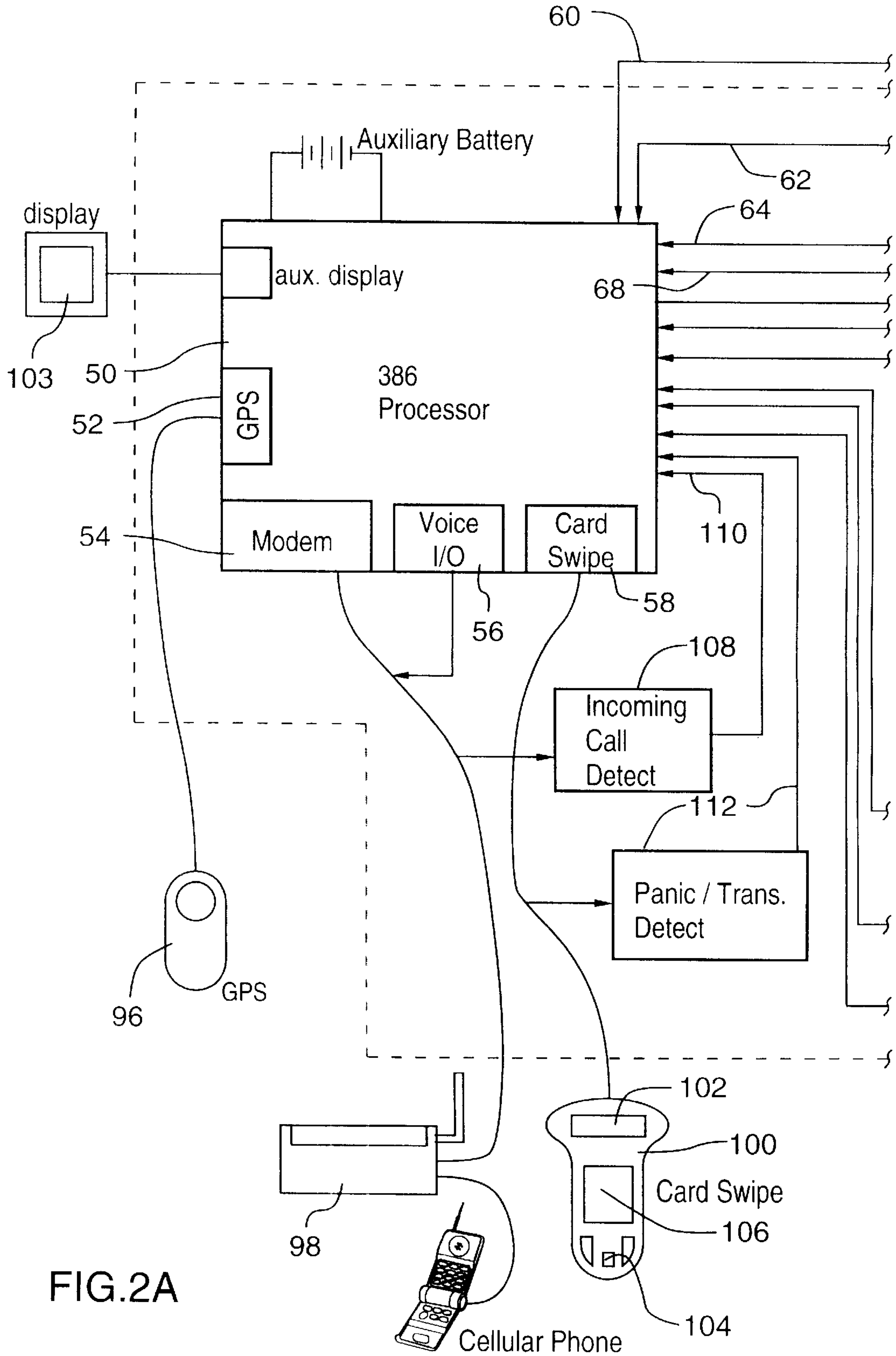
FIG. 2 is a schematic block diagram of a local controller.
Figure 2B:
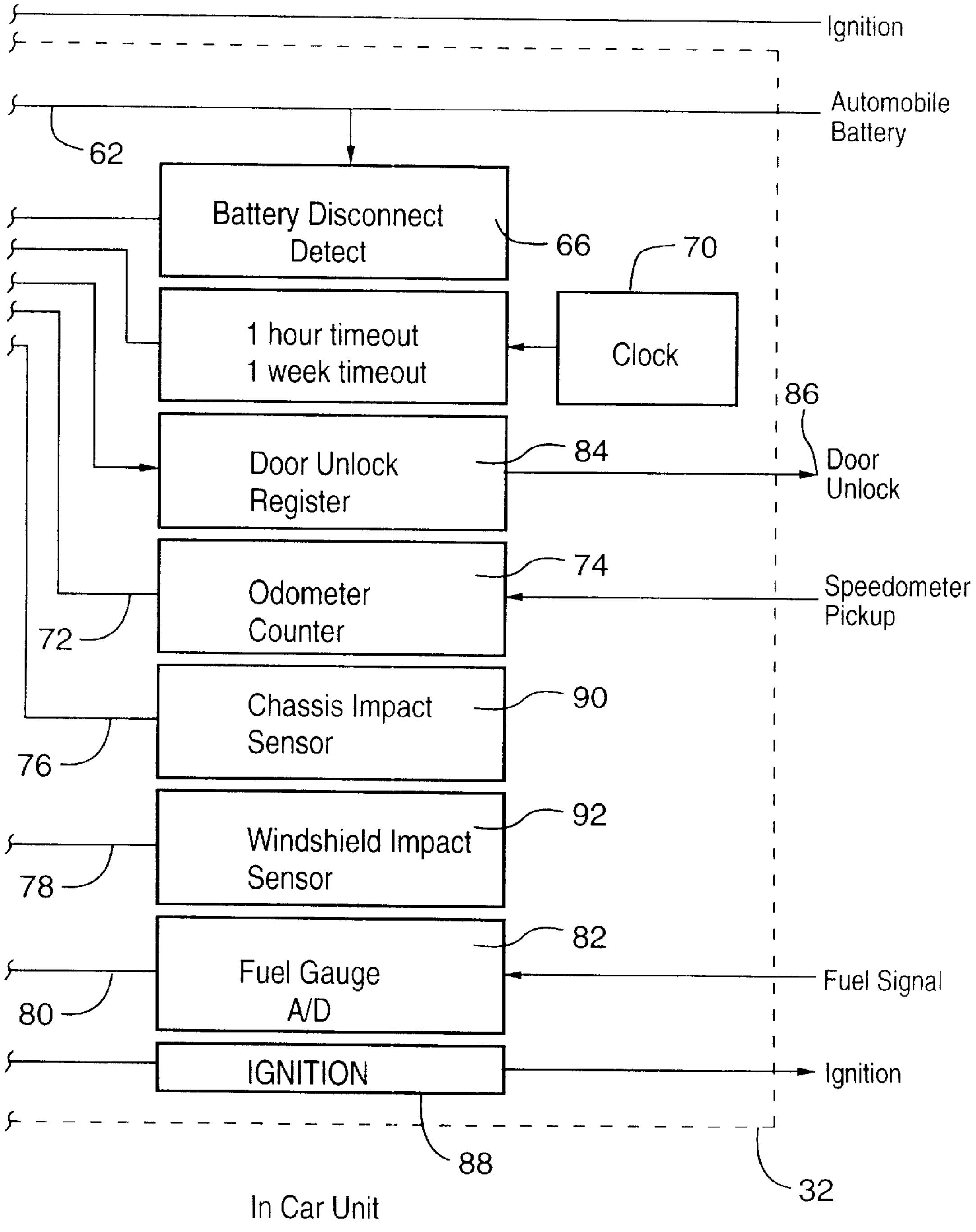

Referring to FIG. 2, a schematic diagram of the local controller 32 located in the vehicle is shown. The local controller comprises a main processor board 50 having a number of interface adapters for connecting to various components. The process of board 50 is provided with a GSP interface 52, a modem interface 54, a voice I/O interface 56, a card reader interface 58. The processor board 50 also includes input ports for receiving input signals from an ignition switch 60, power from the vehicle battery 62, a battery disconnect signal 64 from a battery disconnect detector circuit 66, time out signals 68 from a clock timer 70, a vehicle speed signal 72 received from an odometer counter and speed pick-up 74, a chassis impact sensor 76, a windshield impact sensor 78 and a fuel level signal 80 from a fuel gauge 82. The processor board also provides output signals to a door unlock register 84 which in turn provides a door lock and unlock signal 86, and an ignition inhibit or control output signal 88 is also provided. The processor board is also connected to a source of auxiliary power such as a battery should the vehicle battery fail. Both the chassis impact and windshield impact signals are provided by respective impact sensors 90 and 92 respectively.

The interface components such as the GPS interface 52 is coupled to a GPS module which is commercially available such as the Delorme Tripmate™. The modem interface and voice I/O interfaces connect to a cellular phone transceiver and keypad which may be integrated into the processor board or may also be connected as a stand-alone unit 98. The GPS unit is indicated by numeral 96. Critical to the operation of the local controller and the overall tracking system is a card swipe terminal or card reader terminal 100 which is connected via the card swipe interface to the processor board 50.

The card swipe terminal 100 includes a card reader for reading both credit cards and so-called smart cards or chip cards, which are provided with integrated circuits for memorizing data and for communicating this data with the card reader 100. The card swipe terminal also includes a key pad 104 and a display 106 and auxiliary display, and printer. Card swipe readers 100 with these capabilities are also commercially available such as the E620 model marketed by International Varifact Inc.

An incoming call detection circuitry 108 is coupled to the cellular telephone 98 and provides an output 110 to the processor board as an incoming call detect signal 110. A panic detect signal 112 is provided from the card swipe 100 to the processor board 50. These circuits will be discussed in more detail below.

Figure 5:
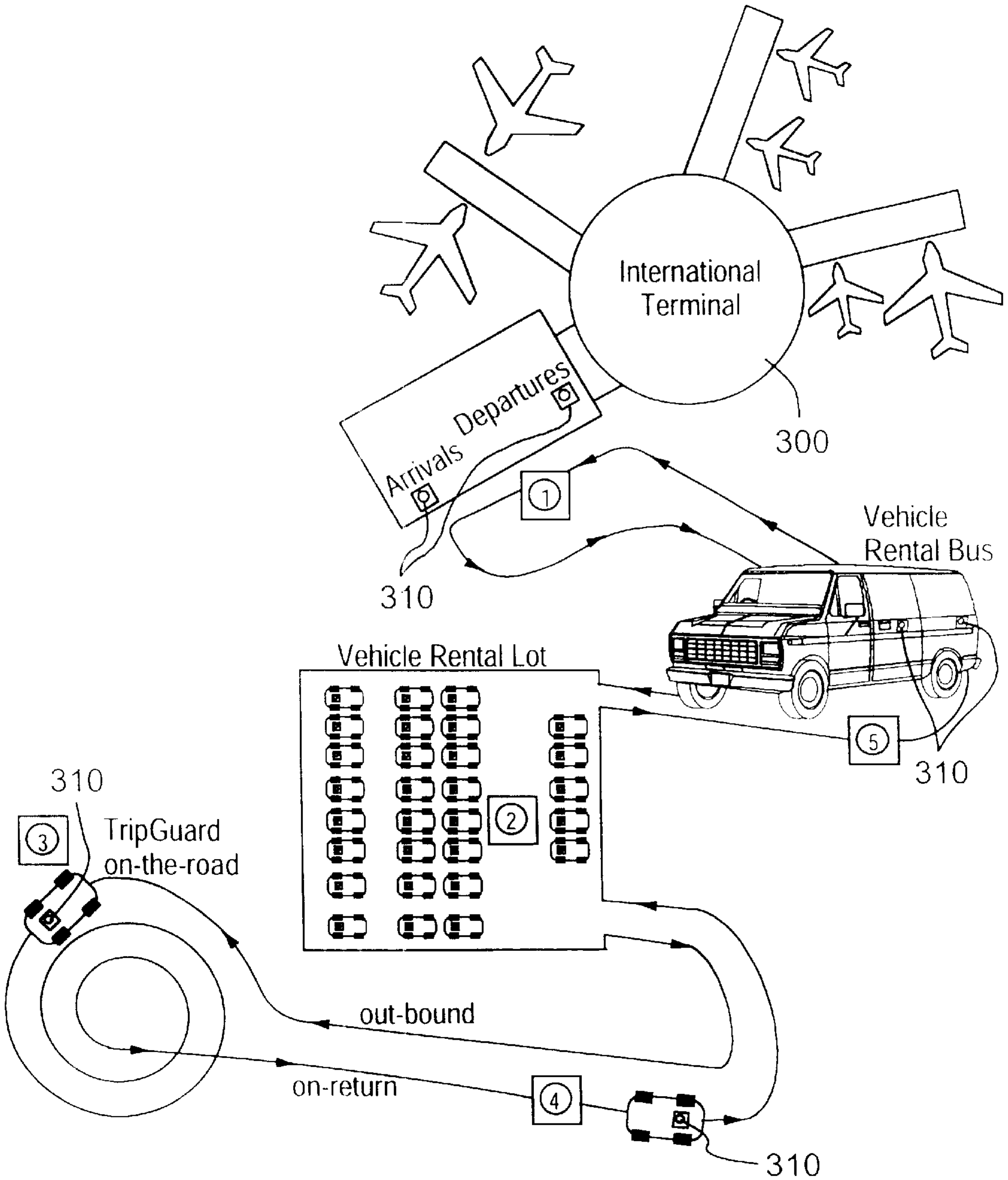
FIG. 5 is a schematic diagram of a vehicle rental automation process.

Turning to FIG. 5, a typical application of the system 10 is shown. The use is shown in the context of an airport vehicle rental automation system. Typically, provides a credit card or is provided with a special smart card containing pre-authorized information pertinent to that customer. The information contained on the card may include identification of the customer, credit authorization and such like. On arrival at the terminal 300 the customer presents either the credit card or the memory card to a card swipe reader located at a kiosk or similar location 310. The kiosks 310 include a keyboard and entry means which allow the customer to provide validation data and other pertinent information such as duration of rental and other relevant information. This information may be forwarded to a relevant HQ processor for validation or may even be performed locally at the kiosk. Once the relevant information is validated by the rental company, the user may be presented with a P.I.N. number or authorization may be automatically uploaded to the smartcard.

The customer is then taken to the vehicle rental parking lot via a rental bus having card swipe facilities alternative to kiosks to a selected vehicle or may choose from one of a random number of vehicles. The credit card or smart card is swiped through the card reader of the local controller in that vehicle and the customer is validated by the vehicle processor if, for example, the customer is using a smart card or if simply using a credit card and P.I.N. number then the appropriate P.I.N. number is entered by the keyboard of the local controller which is able to validate this with the HQ controller by dialing the HQ controller using its local cellular telephone located in the vehicle.

The customer then may utilize the vehicle as normal. The location services and other parameters of the vehicle are monitored by the HQ controller for the duration of the rental. Features of this aspect of the invention will be discussed below. Once the customer has completed the rental, the vehicle may be returned to the vehicle rental parking lot and the transaction is terminated by the customer swiping the credit card through the card reader terminal. The customer's account is then automatically charged with the appropriate amount. Thus this system, from the customer's point of view, provides an efficient and secure purchase of rental services.

Turning back to FIG. 2, the processor 50 in the vehicle is programmed with software to permit the GPS sensors 96 in the vehicle to input data to mapping algorithms and data stored in the computer or on storage devices such as CD Roms (not shown) to geo locate the vehicle. Furthermore voice activation input/output means are provided to the processor to communicate information and data via the cellular phone 98 to the HQ controller 6. The HQ controller includes fuzzy logic software for either processing the data or switching a telephone call to a regular land line telephone system.

By providing a suitable set of commands via the keypad or the voice activation unit located in the vehicle the customer is able to access information or data related to the current geographic location of the vehicle. Since, the geo location coordinates of the vehicle is known by the HQ computer, this geographic specific information may be selected by the HQ computer fuzzy logic and provided to the customer rather than providing a large quantity of irrelevant information. Furthermore, since the location of the vehicle is known this provides an improved safety and security to the customer should a distress situation be encountered. The HQ computer includes software for tracking and calling a selected vehicle to determine the vehicle's latitude and longitude geo location from its GPS sensors and for interrogating the vehicle's on board diagnostic system (OBD) to monitor the condition of the vehicle. The position of the vehicle is displayed in real time by mapping software at the HQ computer to establish any potential out of normal conditions of the vehicle needing response or contact with the customer. In addition the processor 50 located in the vehicle may establish communications with the HQ computer at pre-determined or random times to provide amongst others the geo position of the vehicle and the state of other sensors and the state of the OBD to the HQ computer. This geo information may be used to provide a real time direction and compass display.

Non-intrusive interrogation of the vehicle can also be done to ensure the safe condition and operation of the vehicle by the HQ computer and if needed activation of voice communication in the computer to warn the vehicle operator of potential problems. Similarly, the operator can interrogate these systems to determine the vehicle's condition and potential problems and can voice activate the telephony communications to either or directly to a specified number or to call the HQ computer which may then route the call to the appropriate destination.

It may be noted that the individual components of voice activation for the use and control of computers, the use of geo position sensors and the use of mapping software in mobile computers in vehicles are each well known as is the linking of each of the individual components to standard telephony communications using radio, cellular, PCS and digital devices. However, it is the interaction and combination of these devices using fuzzy logic to create a communication system for use in vehicles to permit the access of information and data tailored to specific geographic areas and locations and for facilitating a map driven information and data retrieval and communications capability between the vehicle and its operator, that is not known to date.

A further embodiment of the invention provides for voice recognition software included with the processor 50 to permit the vehicle operator to utilize voice control to access and retrieve information stored in the computer. This information can include vehicle location, a display of the vehicle's geographic and street map location and such like. Similarly, the customer can access the cellular phone by voice commands to access the local telephone system or to access the HQ and to thereby retrieve information and data stored in the HQ's computer.

The operator of the vehicle could request any type of information or data from the vehicle computer such as, but not limited, to the following examples:

A simple request, such as "where are we" to which the system will invoke its fuzzy logic software, appropriate voice activation, geo positioning and mapping software to report the latitude, longitude or town, street, or highway closest landmark. More complex request could be of the form "how far from here to location/town/road/landmark" and this could be followed by "route" to request an efficient travel routing. The response may include voice commands, computer screen graphics or hard copy printout. Thus the information is only limited to the information stored and retrieved and is as accurate as the most recent updated information stored in the computer.

Furthermore, the operator of the vehicle is capable of communicating with any system connected to the network and not limited to the HQ computer. Thus information could be shared if so desired by the operator by the Internet with any number of mobile telephony systems.

The local controllers in each vehicle are also capable of providing updated information at pre-determined times to the HQ computer. Also a timely source of geo located information can be uploaded to the HQ computer by the vehicle operator calling the HQ computer to update all the HQ computer's information on conditions such as the vehicle location, road conditions, weather, accidents, emergencies, traffic flow and points of interest to thereby provide updated information and improve safety and security to all other customers with access to the HQ computer facilities.

The system also provides integration of telephony, map driven HQ software systems, interrogation algorithms, fuzzy logic algorithms, data storage and retrieval systems to communicate non-obtrusively to the vehicles. In the vehicle computer, software, circuitry, GPS, OBD, other sensors including collision detectors, voice activation systems and telephony equipment permit the HQ computer to call the vehicle using local phone lines and phone company telephone systems to access the end vehicle system's computer to monitor the vehicle location and condition.

On the other hand the vehicle operator can access a plurality of vehicle information and data using voice activation, keyboard, touch screens and such like.

Once again, a unique feature of the invention is interfacing of all the components attached to the local processor to create a communication system for use in mobile vehicles which permits an HQ computer to access the end vehicle on OBD, collision sensors, GPS, to facilitate a geographical map driven information and data retrieval and communications capability and to unobtrusively monitor the vehicle to detect any non normal condition or activity of the vehicle at its location at the time of interrogation. Although this application is described in the context of the rental vehicle industry, it may be equally well applied to other services.

Figure 3:
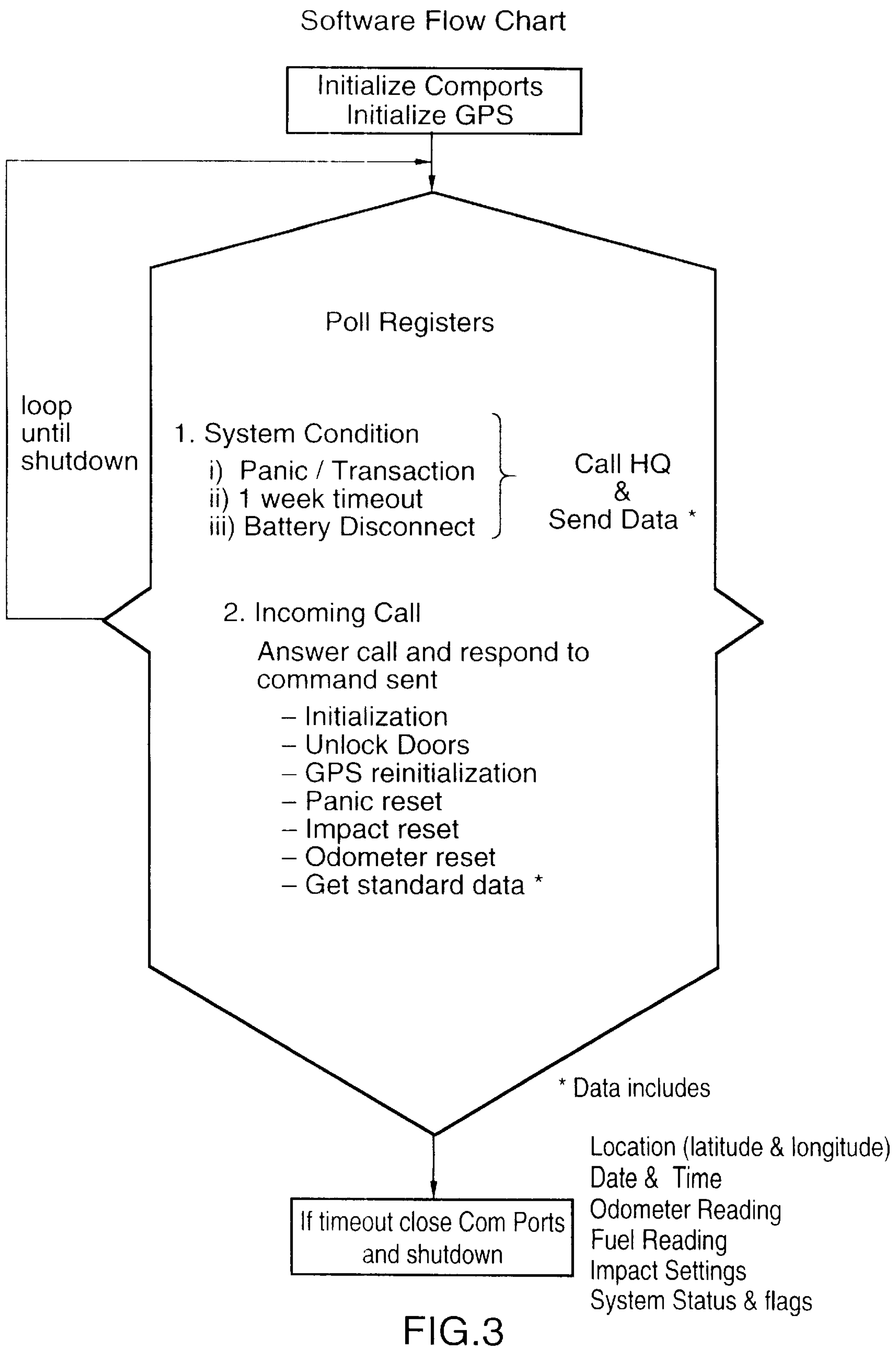
FIG. 3 is a high-level flow diagram implemented by the controller of FIG. 2.

Referring now to FIG. 3, a flow chart showing the sequence of steps performed by the software is shown. The process begins by the initialization of the communications ports and other I/O and then the initialization of a GPS sensor. The processor then follows a main loop polling its registers. Firstly, should a system condition be detected the processor will initiate a call via the cellular telephone interface to call the HQ computer and send the appropriate system condition data. This data may include but is not limited to a panic alarm, a transaction request message from the vehicle operator (this will be discussed in detail later) a time-out or a battery disconnect signal.

When in the main loop the software monitors a port for an incoming call which if received, the call is answered and responded to in accordance with a command received from the HQ computer. For example, this may include initialization of the local processor, unlocking of doors, GPS re-initialization, panic reset, impact reset, odometer reset ignition or gas flow disable or the retrieval of standard data. Standard data includes GPS information (latitude and longitude), date and time, odometer reading, fuel reading, impact readings, system status and flags. A time-out is set for which the processor runs through this main loop. If the processor times-out then the ports are closed and the processor shuts down. It may be noted that even though the processor shuts down the ports are still monitored for incoming calls, which then reactivate the main process loop.

Figure 4:
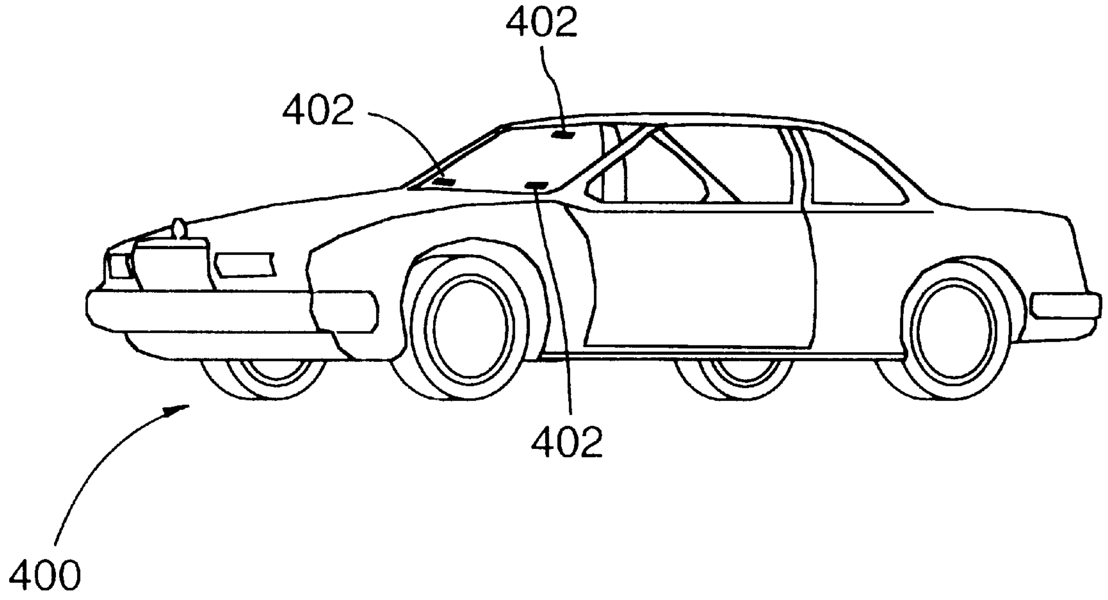
FIG. 4 is a schematic diagram of a vehicle parameter sensor arrangement according to an embodiment of the present invention.

Referring to FIG. 4 a schematic arrangement of a windshield impact sensor is shown by numeral 400. As discussed earlier, it is desirable to monitor and log damage to a rental vehicle for the purposes of billing the appropriate customer. In the present system, such damage is easily monitored.

For the detection of collisions or impact electronic damage detectors such as accelerometer, strain gauges, acoustic, vibration, type sensors are utilized. These sensors 402 are fastened to the windshield or fastened to the vehicle body 404 frame and provide outputs to the processor circuitry via appropriate conditioning circuitry (not shown). The processor receives the signals and it converts them to suitable values indicative of the degree of body damage. This information is saved in a data base or in memory in the processor and may be communicated by any one of the means described above to the HQ computer or other calling facility. The local processor utilizes an intelligent or fuzzy logic algorithm to select and switch between the vehicle system conditioned reporting of the damage occurrence data and the stationary system requesting and receiving the data. By providing access to the damage occurrence information the current system provides improved safety and security to the customers and also allows for timely repairs of the vehicles. The collision information is not restricted to windshields but includes windows, bumpers, body doors, fenders, underbody, frame and running gear and such like. With the present system of logging such information, this information may be classified to provide a vehicle history of record of use or abuse much like the odometer provides an overall wear and tear history or mileage of the vehicle.

The above system may also be utilized with smart cards and the like to provide a mobile point of sale system (POS) accessible to the customer while in the vehicle and providing services tailored to the customer's current geographic location. The swipe card terminal 100 may be provided with a sensor for reading magnetic strip credit cards, smart cards and debit cards. These cards may be used as a key to unlock or activate user access to the vehicle computer system or as one of the sources of information to be communicated. The cards may also be used in conjunction with the card reader input keypad. The card information may be conveyed to the HQ computer either as a digital signal or in conjunction with actual voice signals. Furthermore, some services require the entry of credit card numbers entered by a telephone keypad. To this effect, the system is capable of converting the user credit card number to appropriate tone signals or in the case where voice tones are required, the computer may synthesize the information to voice or by computer coding the information to audible tones.

Furthermore, this information may be transmitted to the requesting party utilizing the cell phone cellemetry channels while the user is communicating over the regular voice channels of the cellular network. Thus this feature allows transparent submission of data to the requesting parties. Similarly, PIN numbers or identifying codes may also be submitted.

Thus, a mobile point of sale device is implemented which allows the user to access service providers within its geographic location. This is implemented by the HQ computer which utilizes fuzzy logic and the GPS data to select the most desirable service provider for the user and to purchase and arrange for payment while on-line or travelling in the vehicle.

The use of the cellemetry channels or side band channels of the wireless communication may also be used to transmit motion detector or glass breakage signals via the HQ computer either to inform the HQ computer controller of vehicle theft or to signal a cell phone to alert the customer to the vehicle theft.

Figure 6:
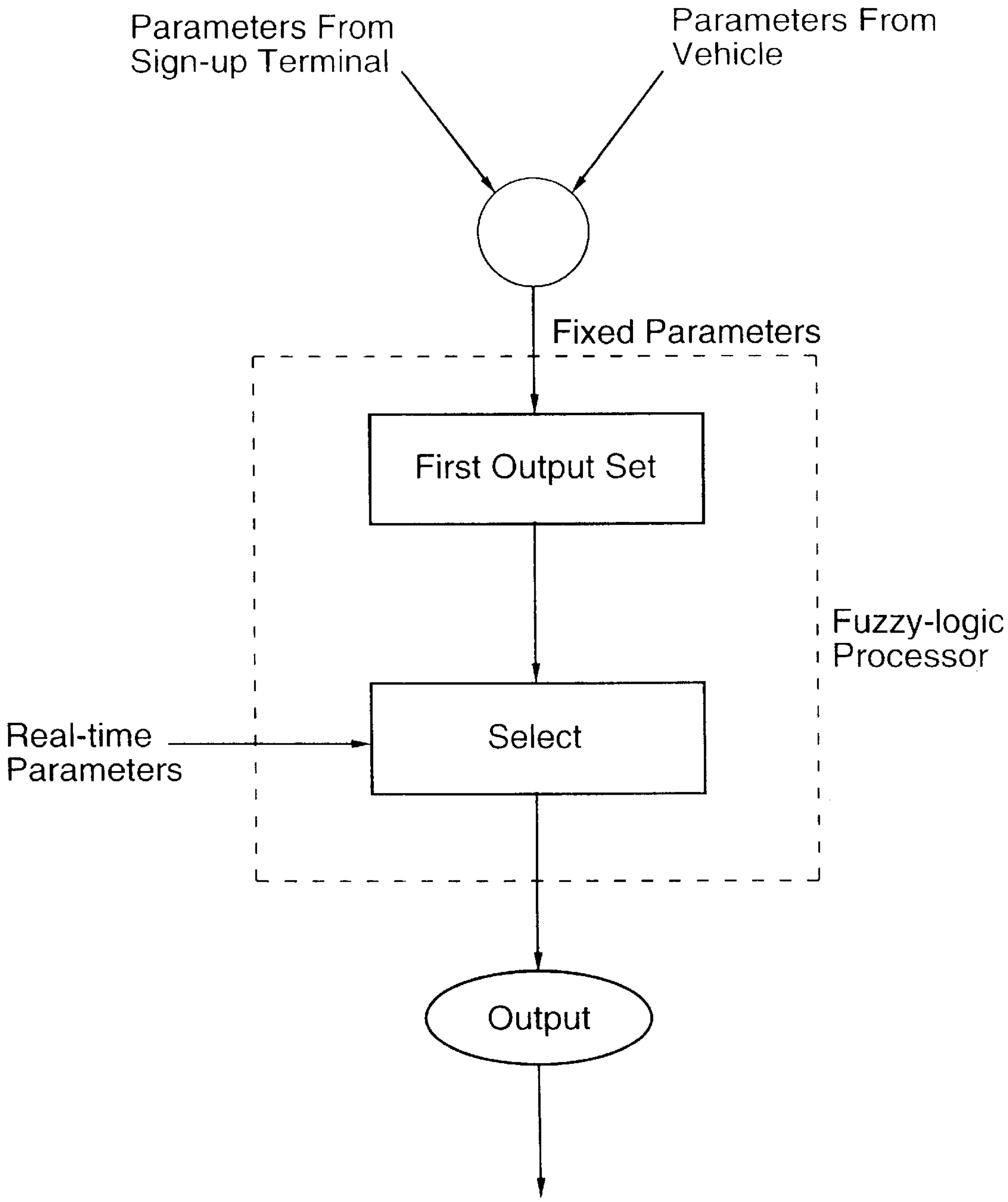
FIG. 6 is a schematic diagram of a fuzzy logic selection algorithm.
Figure 7A:
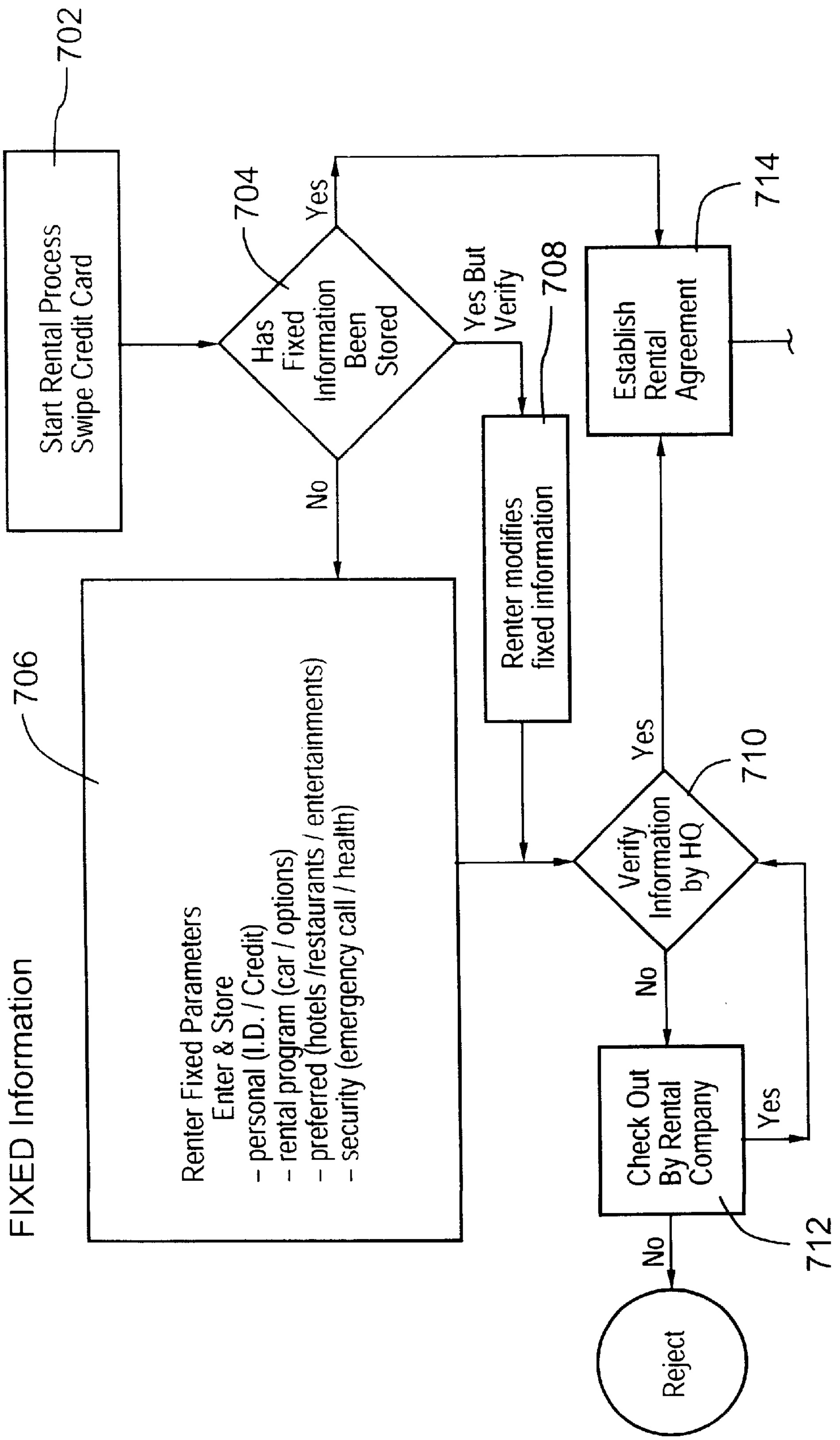
FIGS. 7(*a*), 7(*b*) and 7(*c*) are schematic diagrams of a process flow incorporating the fuzzy logic of FIG. 6.
Figure 7A:
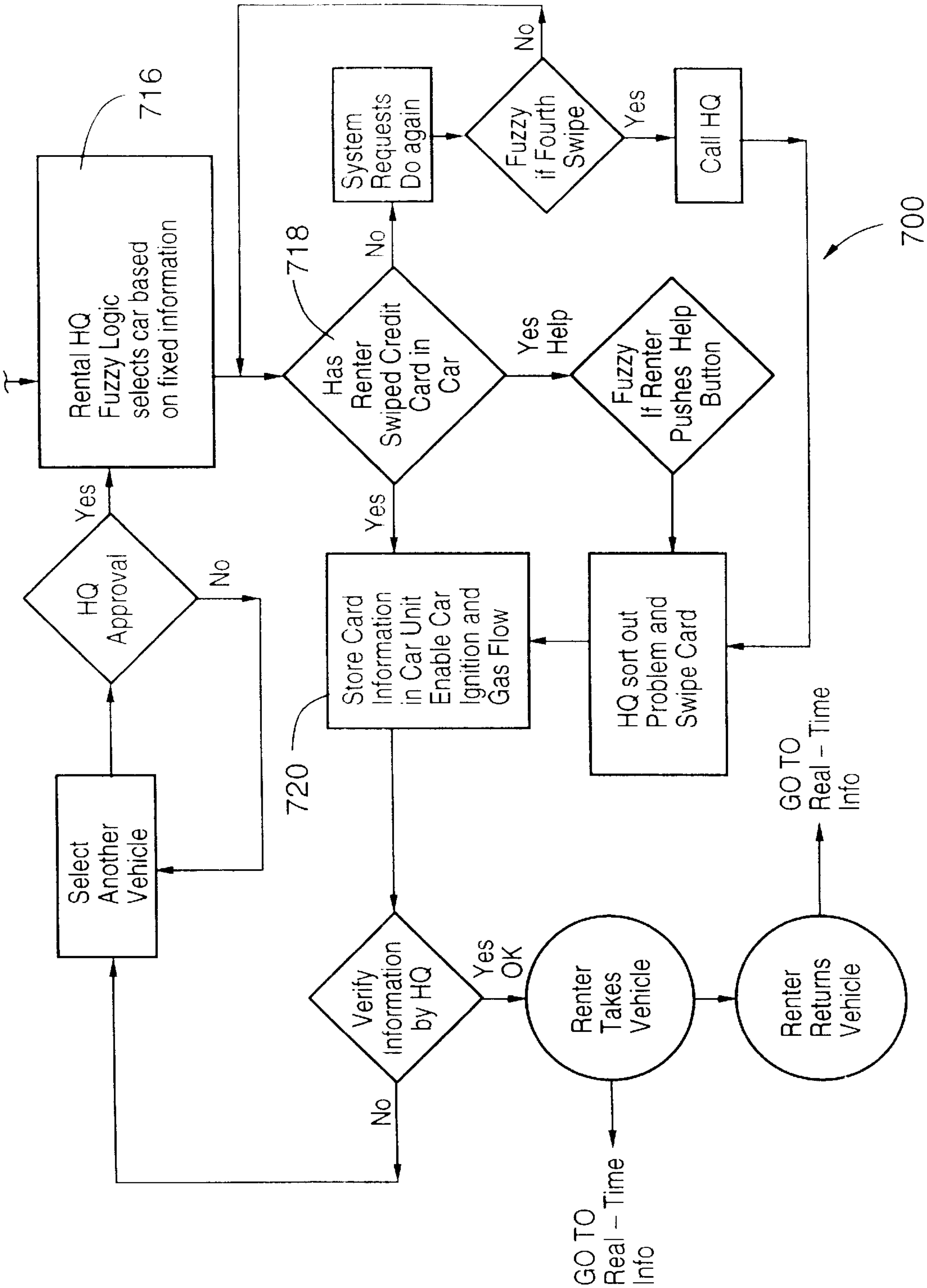
Figure 7B:
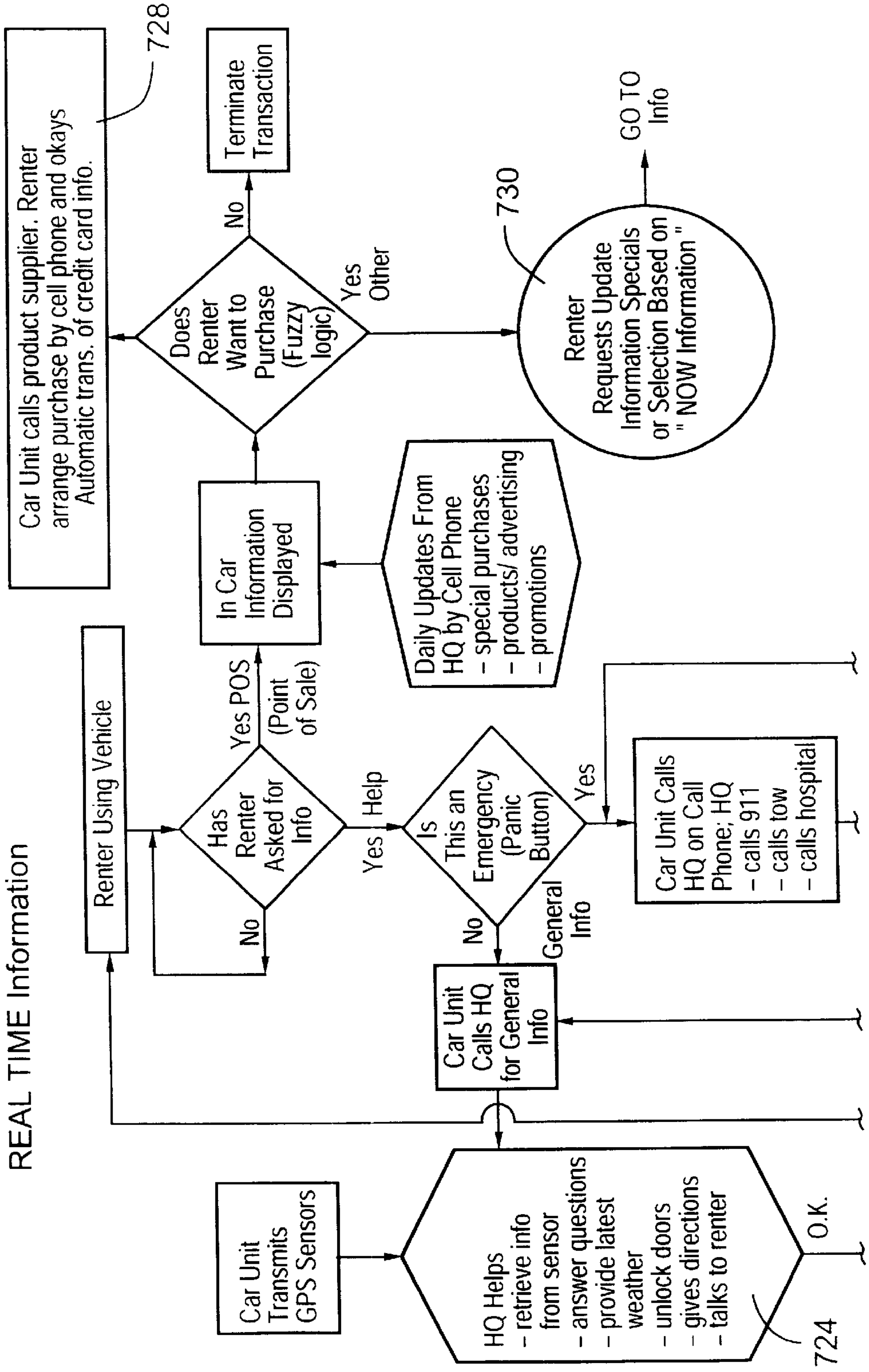
Figure 7B:
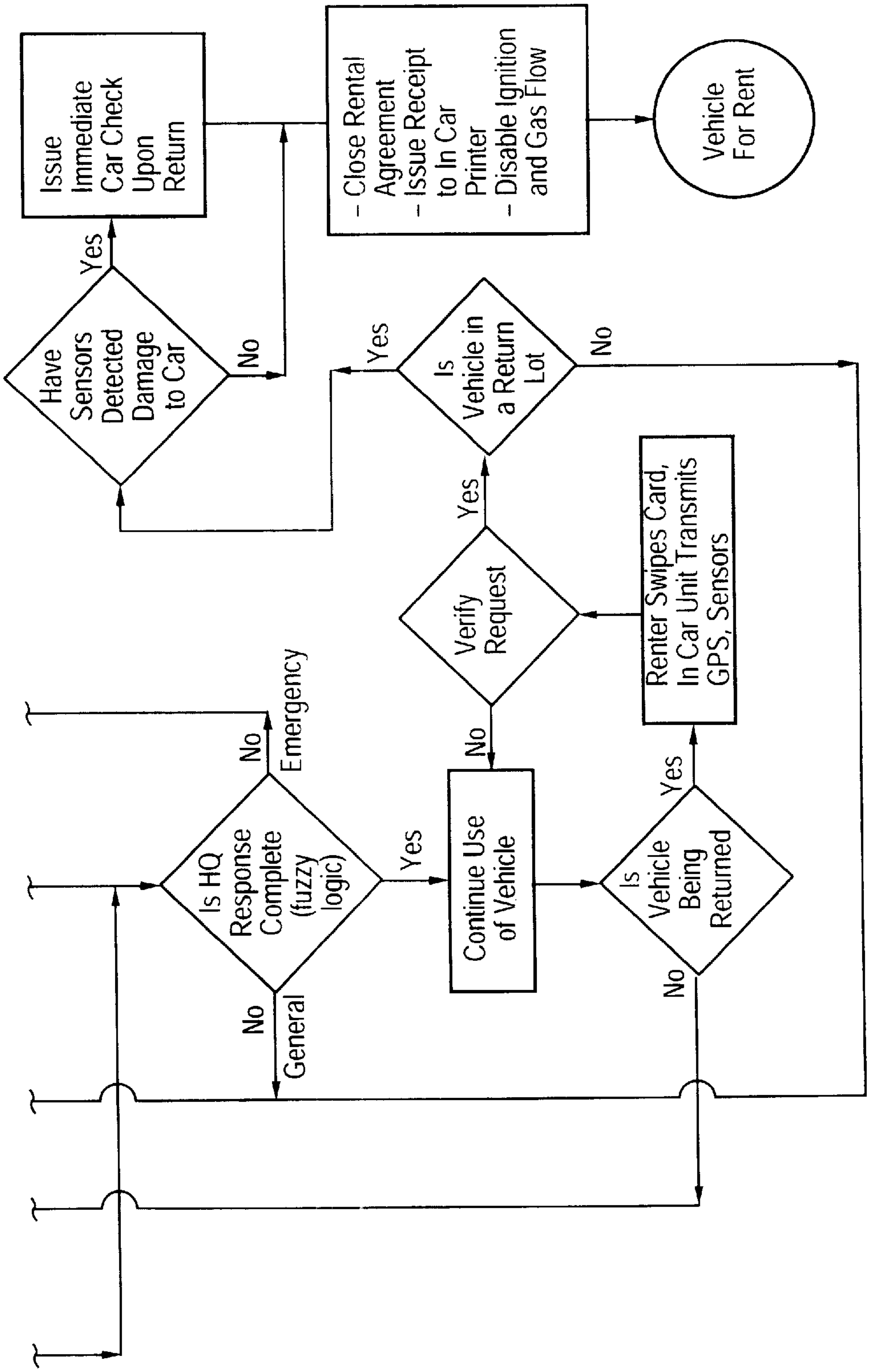
Figure 7C:
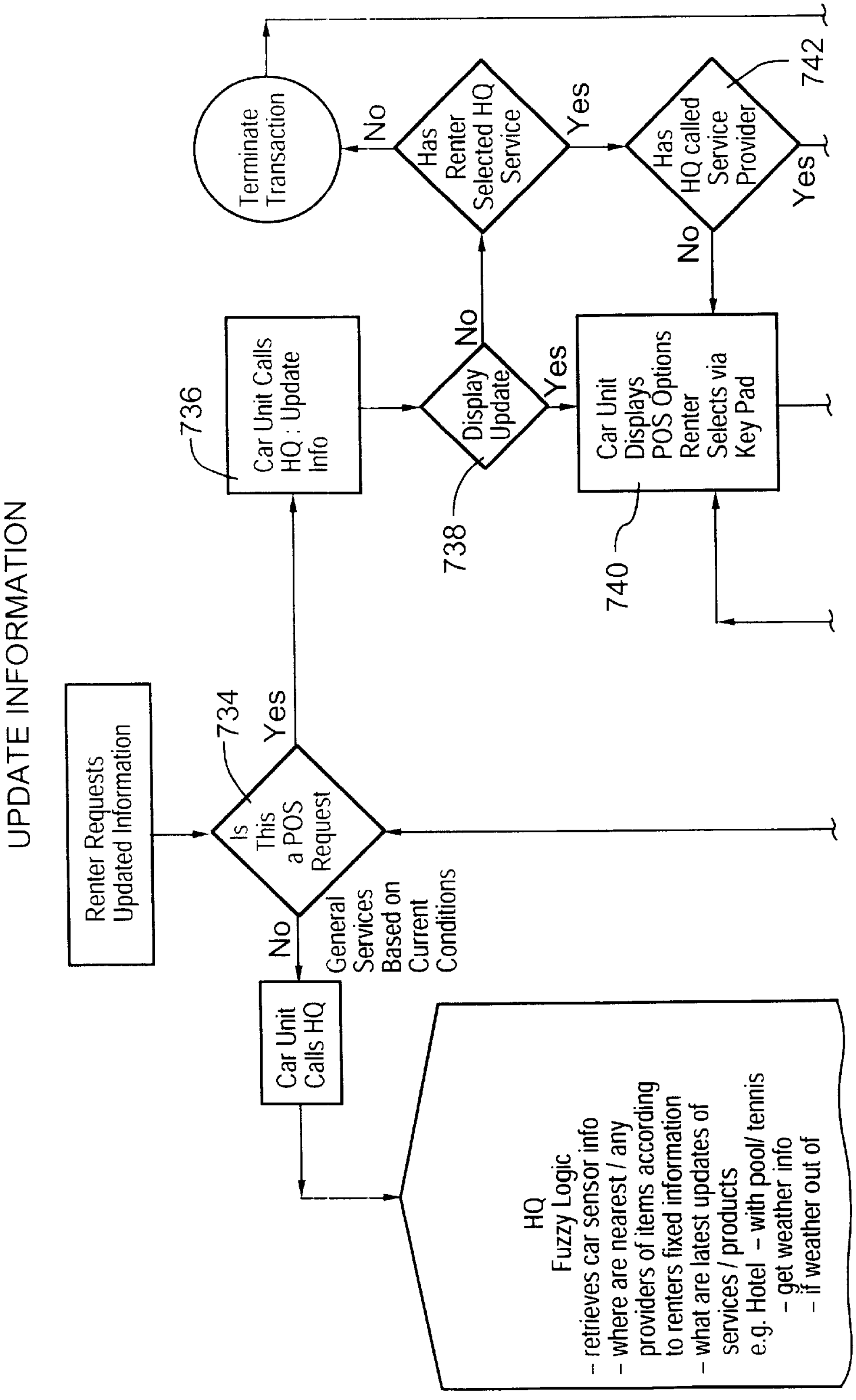
Figure 7C:
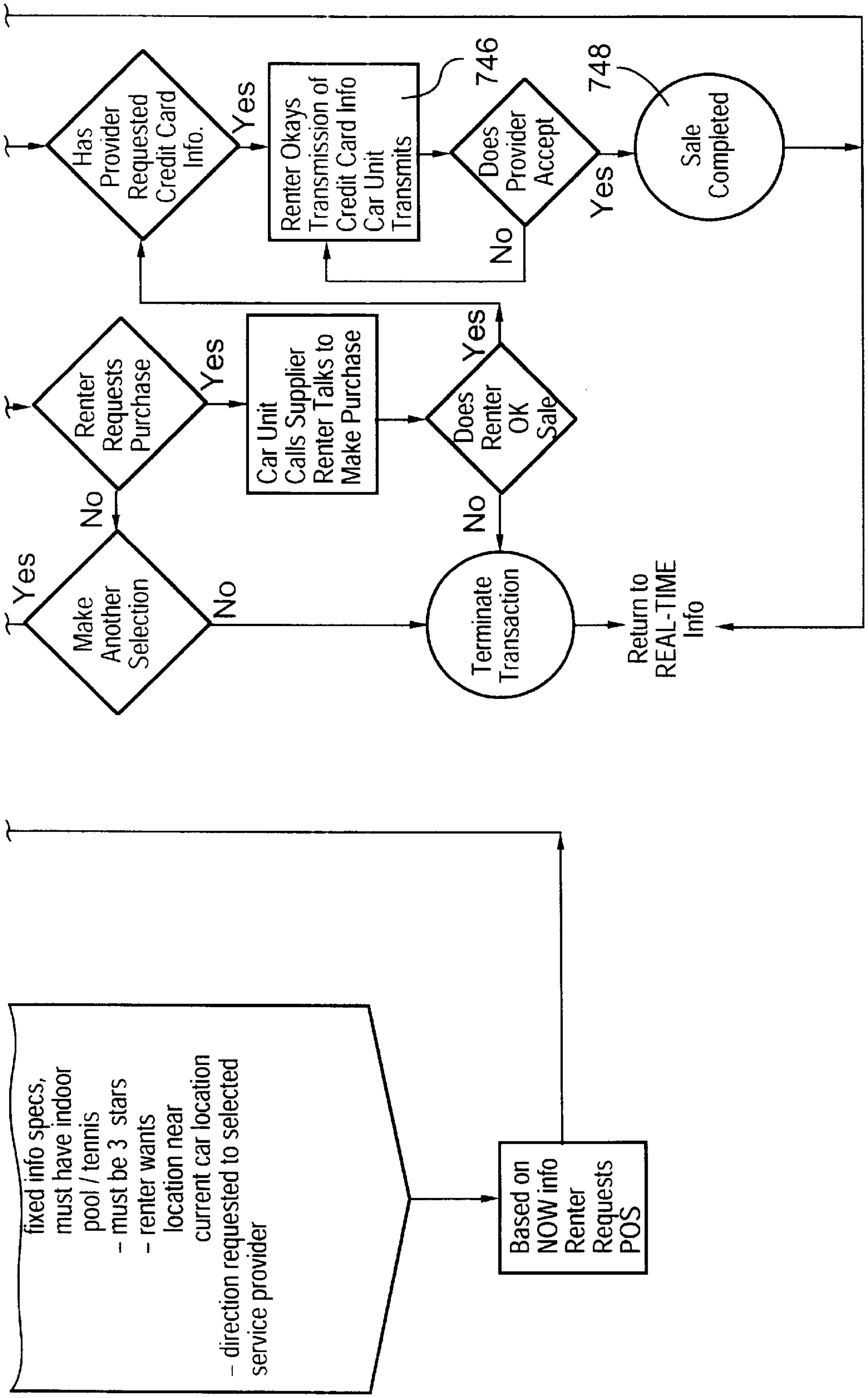

Referring now to FIG. 6 a schematic diagram of the fuzzy logic selection algorithm implemented on the HQ computer is shown by numeral 600. The HQ computer accepts a set of parameters from the customer which is normally transmitted from the vehicle and entered either from the user's card or via the input keyboard specifying pre-determined information or services. A second set of fixed parameters is provided from the vehicle such as geographic location, fuel sensors and such like. A first output set 606 is generated in accordance with these fixed parameters. This output set is selected from a larger database of information. The HQ computer also accepts a set of real time or changeable parameters such as weather conditions, special offers and such like. At block 610 those real-time parameters are used as decision criteria to tailor the first output set 606 which is then output or transmitted back to the customer via the channels as described above.

Referring to FIGS. 7(*a*), 7(*b*) and 7(*c*), a schematic diagram of the overall automation process as applied to a vehicle rental is shown generally by numeral 700. In FIG. 7(*a*) the rental process begins by the customer swiping a credit card at a rental agency kiosk 702. The customer's credit card number is used to verify whether certain information pertaining to the customer has been previously stored. If this information has not been previously entered the customer is requested to re-enter this fixed parameter information which may be done either manually via a keyboard at the kiosk or may be read directly from a smart card. This information includes the customer's personal I.D., rental program desired, preferred hotels, restaurants, entertainment and other information such as emergency contact information and such like 706. The customer is also given the opportunity to re-enter and modify this fixed information 708. Once this information has been entered and the customer is satisfied, the information is forwarded to the HQ computer where it is verified 710. The information is checked out by the rental company at the HQ computer 712 where it is rejected if the information is not valid, or, if the information is accepted, a rental agreement is established 714.

Based on the fixed parameters 706 supplied by the customer, the rental HQ computer implements a set of fuzzy logic rules based on a rule set to select a vehicle 716. At the selected vehicle, the customer swipes the appropriate credit card or smart card in the card reader 102 of the card swipe terminal 100 in the vehicle. If the validation of the information is correct the local controller in the car enables the car ignition and gas flow 720. If the customer is having difficulties or a problem is detected in swiping the card the system provides help by calling the HQ computer and providing either audio or text display help in the vehicle display. If there is a problem with the vehicle at that time, the HQ computer has the ability to provide another vehicle for the customer.

Turning to FIG. 7(*b*), once the customer is in the vehicle and the vehicle is operational, the car unit or local controller transmits various information to the HQ computer 724.

Once the vehicle has been used the in-car controller simply waits for a response from the user and at the same time monitors various parameters in the vehicle as set out and described with reference to FIG. 3 earlier. The renter while using the vehicle may wish to use the in-car controller as a point of sale device. At the customer's request, i.e. by activating a button on the keyboard or if by continuous scrolling, information is displayed either on the card swipe display 102 or the auxiliary display 103 shown in FIG. 2. It may be noted that the information displayed in the in-car information display is normally pre-stored in the memory of the processor board 50. This information may be up-dated from the HQ computer by cell phone communication at times which are transparent to the user, for example while the car is not being used, at midnight or other convenient times. Should the customer wish to make a purchase of a particular item displayed the local controller initiates a call to the appropriate supplier. The customer then arranges purchase by cell phone and approves automatic transmission of credit card information 728. The customer may also wish specialized information or up-dates 730.

Turning now to FIG. 7(*c*), when the renter requests up-dated information, the local controller determines whether this is a point of sale request 734. If this is a point of sale request then the local controller initiates a call to the HQ computer to up-date information 736. The information, once up-dated on the local controller, is displayed 738 whereby the customer may then select the required service via the keypad 740. Alternately the customer may select the HQ computer to call the service provider. In this case, the HQ computer initiates a call to the service provider 742 and sends requests back to the local computer for the customer to approve any provider requested information 746. If it is accepted the sale is then completed 748.

Figure 8A:
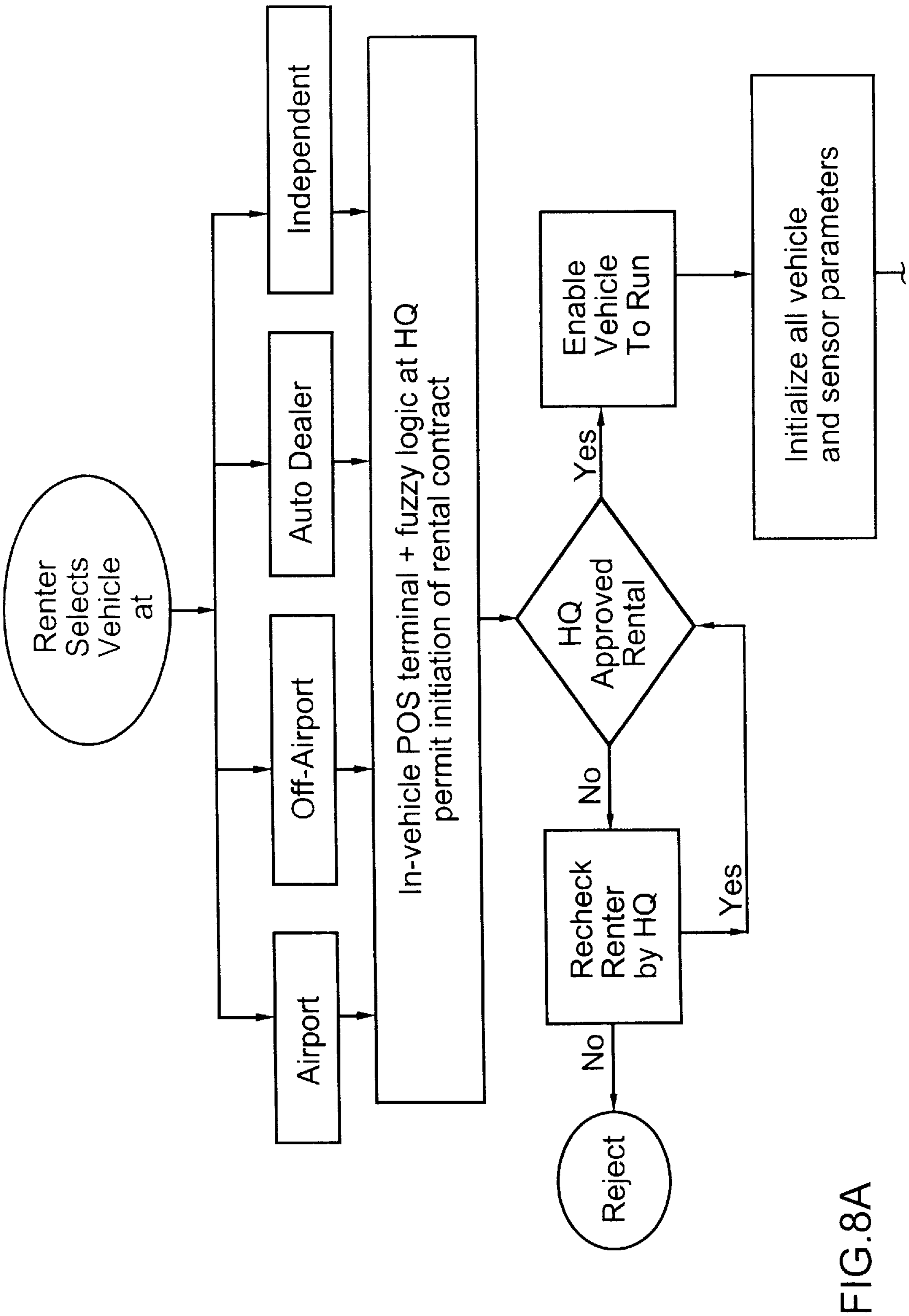
FIG. 8 is a flow diagram of an automated vehicle rental service provision system.
Figure 8B:
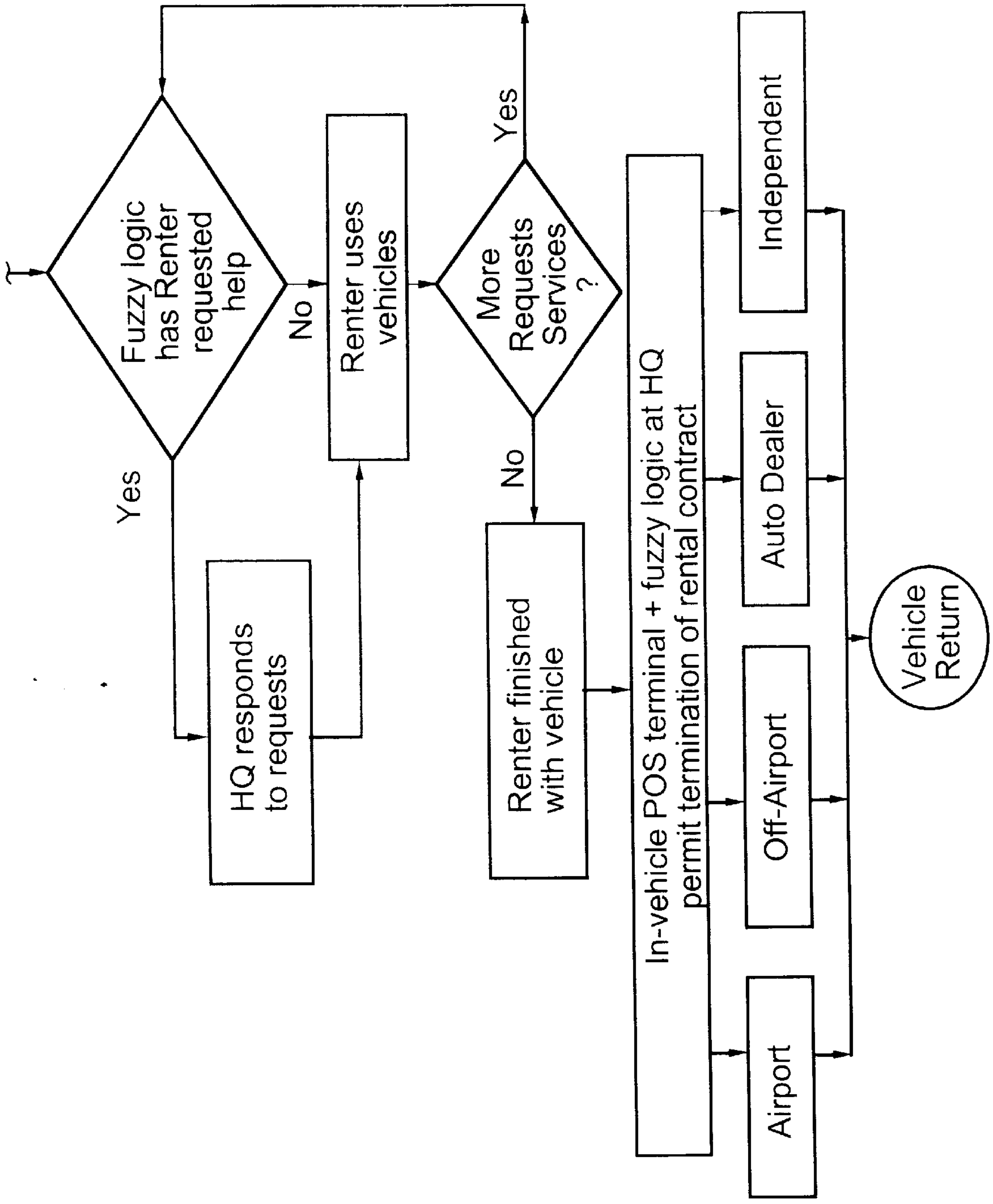

As described earlier, a typical application of the system of the subject invention is in the automation of a car rental system shown in FIG. 8. Because of the push for cost cutting, any reduced use of the rental counter or time of the rental counter staff will improve the efficiency of the vehicle rental industry. Automating the vehicle rental contract procedures and eliminating renter interaction with the counter staff, ie., "Counter Bypass" will improve efficiency and service to the rental customer. This will greatly speed up the initiation of a vehicle rental contract, selecting the vehicle, closing off and returning the vehicle. This is not only important for airport locations where speedy turnaround of rentals is important, but applies equally to off-airport locations.

Having the hardware, electronics, wireless communications and card reading (credit, debit, smart) components and fuzzy logic software of the device of the subject application installed in rental vehicles and at the rental office, the rental company has an effective and efficient fleet management tool. Functions provided include Point of Sale (POS), GPS tracking/location of vehicles for better dispatching; vehicle monitoring of functions such as mileage, service intervals, speed, gas levels, collision detection; vehicle control such as door locks and starter/ignition disable.

In the example of an airport vehicle rental system illustrated in FIG. 8 approved rental customers can fly into the airport and go directly to the car rental lot and selected vehicle. The keys may be left in the vehicle as the system of the subject invention will have disabled the vehicles until the customer slides his card in the reader. The fuzzy logic software can verify the customer, initialize the rental agreement contract, request possible code or PIN (personal identification number) and enable the vehicle to be started. The customer is then on his way—having never seen or interfaced with the usual "Rental Counter" problems and delays.

Furthermore, in the airport example, upon vehicle return, the GPS tracking and fuzzy logic software will determine the rental customer, they are returning the rented vehicle as the vehicle approaches the rental company return parking lot and commence close-off of the rental agreement. The close-off includes reading the mileage and fuel tank levels, reporting collision occurrence during rental, completing the contract including charging to the renter's credit card and printing out the receipt to the in-vehicle printer. Renters can quickly be on their way to catch their flights without being delayed dealing with rental agency staff either at the parking lot or at a kiosk; and rental staff can be deployed and only need to inspect those vehicles reporting collisions.

A log of the rental transaction and vehicle usage information, handles full accounting, billing, credit car payment and receipting and shutdown of the vehicle (e.g., starter disables) is created. Thus, the present system reduces the need for agency staff, deters misuse/abuse of vehicles and improves dispatch, deployment, maintenance and servicing schedules.

While the invention has been described in connection with the specific embodiment thereof, and in a specific use, various modifications thereof will occur to those skilled in the art without departing from the spirit of the invention as set forth in the appended claims.

The terms and expressions which have been employed in this specification are used as terms of description and not of limitations, there is no intention in the use of such terms and expressions to exclude any equivalence of the features shown and described or portions thereof, but it is recognized that various modifications are possible within the scope of the claims to the invention.

The embodiments of the invention in which an exclusive property or privilege is claimed are defined as follows:

1. An in-vehicle information system comprising:

(a) a local controller, including a wireless communication interface for communication with a central controller;

(b) a geo-location device located in said vehicle for providing current geo-location information of said vehicle to said local controller;

(c) an output device associated with said local controller for presenting said user with a selection of information and merchant services received from said central controller, said selection being based on said current geo-location obtained from said local controller; and (d) a point of sale (POS) terminal located in said vehicle and coupled to said local controller for allowing a user to select and execute a POS transaction on one or more of the presented services while enroute.

2. A system as defined in claim 1 said: geo-location device being a global positing system (GPS) sensor and said vehicle including a plurality of sensors coupled to the local controller for providing information on a plurality of parameters related to the vehicle operation.

3. A system as defined in claim 2, said sensors including a plurality of impact sensors for monitoring body damage.

4. A system as defined in claim 2, including a mapping function for providing directions to a desired destination by said information, based on the vehicle's current location.

5. A system as defined in claim 2, said local controller including a display, a voice I/O interface and a card reader interface.

6. A system as defined in claim 1, said central controller monitoring said geo-location of said vehicle, by querying said local controller to obtain said current geo-location information and using said current geo-location information for selecting from a database of said information and merchant services within a predetermined geographic region of said current geo-location.

7. A system as defined in claim 1, said POS transaction being a debit card transaction.

8. A system as defined in claim 1, said POS transaction being a credit card transaction.

9. A system as defined in claim 1, said POS transaction being a cash card transaction.

10. A system as defined in claim 1, said local controller for transmitting prestored geo-specific information in addition to said geo-location information to said central controller, and the central controller using said geo-specific information in said selection.

11. A system as defined in claim 10, said additional information including one of toll road information, rental location, and vehicle service stations.

12. A system as defined in claim 1, said merchant service information including advertising information.

13. A system as defined in claim 1, said presentation of said information and merchant services being triggered by said local controller upon detecting that said vehicle is within or approaching one of a plurality of pre-stored geo-locations.

14. A system as defined in claim 13, said pre-stored geo-location is a hotel location.

15. A system as defined in claim 1, including a user input interface for said user requesting specific information from said central control while enroute.

16. A system as defined in claim 1, said local controller being reprogrammable via the wireless communication from the central controller.

17. An integrated in-vehicle information and fleet management system comprising:

(a) a central controller;

(b) a local controller including a wireless communication interface for communication with said central controller;

(c) a geo-location device located in said vehicle for providing current geo-location information of said vehicle to said local controller;

(d) an output device associated with said local controller for presenting said user with a geo-location specific information received from said central controller, said information being based on said current geo-location obtained from said local controller;

(e) an interface associated with said central controller for input by a fleet operator of fleet management request for information from said central controller; and (f) an output device associated with said central controller for presenting said fleet operator with a geo-location specific information received from said local controller.

18. A system as defined in claim 17, including vehicle sensor inputs coupled to said local controller for providing vehicle operation parameters to said local controller.

19. A system as defined in claim 17, including sensor outputs coupled to said local controller for controlling one or more vehicle functions.

20. A system as defined in claim 17, said transmission being triggered by detecting that said vehicle is within or approaching one of a plurality of pre-stored geo-locations.

21. A system as defined in claim 17, said information including one of toll road information, rental location, and vehicle service solutions.

22. A system as defined in claim 17, said central controller including an interface for allowing the fleet operator to update the local controller.

* * * * *